(12) United States Patent
Cook

(10) Patent No.: US 6,714,724 B1
(45) Date of Patent: Mar. 30, 2004

(54) PORTABLE DEVICE FOR CAPTURING IMAGE AND SOUND DATA INCLUDING COMPACT MEMORY AND BOARD ARRANGEMENT

(76) Inventor: Bradley Steven Cook, 411-3590 Kaneff Crescent, Cooksville, Ontario (CA), L5A 3X3

( * ) Notice: Subject to any disclaimer, the term of this patent is extended or adjusted under 35 U.S.C. 154(b) by 0 days.

(21) Appl. No.: 09/368,968

(22) Filed: Aug. 5, 1999

(51) Int. Cl.[7] ............................................. H04N 5/225
(52) U.S. Cl. .................... 386/117; 386/125; 348/373; 348/374; 358/909.1
(58) Field of Search ......................... 386/46, 117, 120, 386/52, 55, 125, 126; 348/207, 232, 552, 231, 722, 373, 374; 358/906, 909.1; H04N 5/225

(56) References Cited

U.S. PATENT DOCUMENTS

| | | | | |
|---|---|---|---|---|
| 5,488,433 A | * | 1/1996 | Washino et al. ............ | 348/722 |
| 5,969,750 A | * | 10/1999 | Hsieh et al. ................ | 348/14.1 |
| 5,987,179 A | * | 11/1999 | Riek et al. .................. | 382/236 |
| 6,097,879 A | * | 8/2000 | Komatsu et al. ............ | 386/117 |
| 6,169,575 B1 | * | 1/2001 | Anderson et al. ........... | 348/231 |
| 6,226,449 B1 | * | 5/2001 | Inoue et al. ................. | 386/120 |
| 6,229,954 B1 | * | 5/2001 | Yamagami et al. ......... | 386/117 |
| 6,282,362 B1 | * | 8/2001 | Murphy et al. ............. | 386/117 |
| 6,404,981 B1 | * | 6/2002 | Kumagai et al. ........... | 386/125 |

OTHER PUBLICATIONS

Sony Digital Imaging—Digital Mavica MVC–FD91, 1999 Sony Electronics.
About M2: Specifications, 1999.
Sharp Electronics, VN–EZ1U, 1999.
JVC Company of America, 1999 www.jvc.ca/.

* cited by examiner

Primary Examiner—Vincent Boccio
(74) Attorney, Agent, or Firm—Baker & Daniels

(57) ABSTRACT

A device to encode motion and sound data directly into a computer recognizable format and save the encoded data on a hard disk drive in real time includes a housing having operator controls. A lens and at least one microphone are also on the housing. Processor circuitry within the housing communicates with the operator controls and the at least one microphone. The processor circuitry generates motion data in response to light entering the housing via the lens and captures sound data via the at least one microphone in response to user input made via the operator controls. The processor circuitry includes an encoder to encode the motion and sound data directly into a computer recognizable format. The encoded motion and sound data is saved on a hard disk drive within the housing in real time.

12 Claims, 8 Drawing Sheets

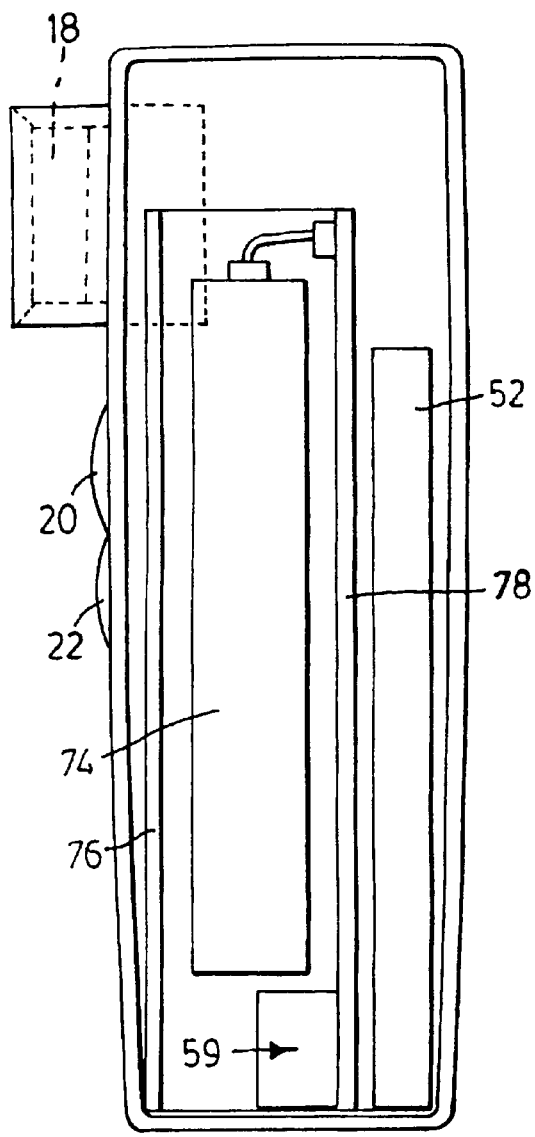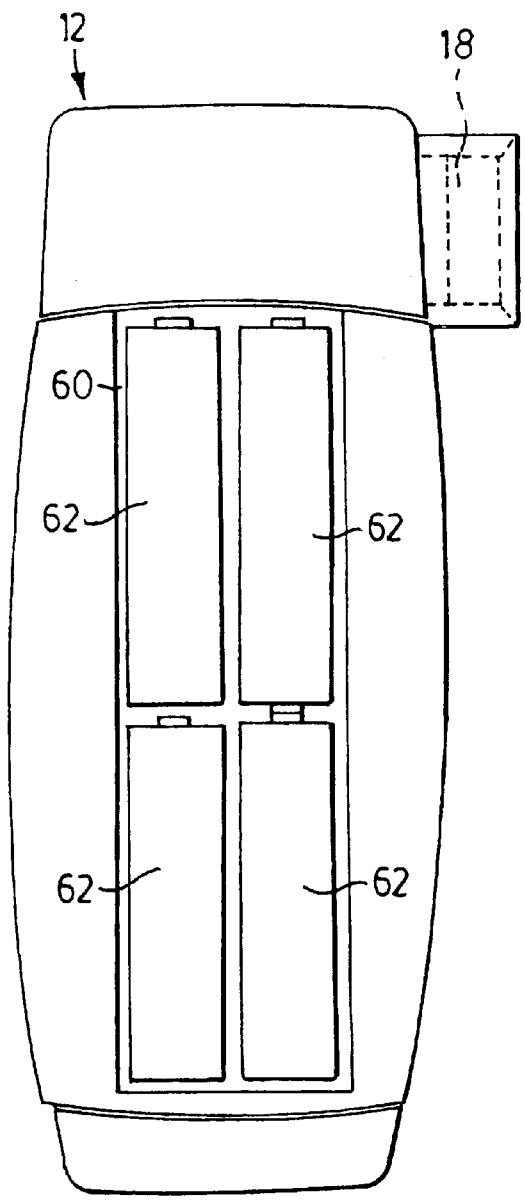
FIG. 4                              FIG. 5

PORTABLE DEVICE FOR CAPTURING IMAGE AND SOUND DATA INCLUDING COMPACT MEMORY AND BOARD ARRANGEMENT

FIELD OF THE INVENTION

The present invention relates to cameras and in particular to a portable device for encoding image and sound data directly into a computer recognizable format and saving the encoded image and sound data to a hard disk drive in real time.

BACKGROUND OF THE INVENTION

Many computer users have a need for relatively low-resolution digital format video images with accompanying audio. Images of this nature are often published on the Internet and/or used for other amateur purposes. To acquire video images in digital form, computer users have in the past used low-quality CCD tethered cameras coupled directly to personal computers. Video images captured by these CCD cameras are sent directly to the personal computers and stored therein in a digital file format such as for example, .AVI or .MPEG formats, without audio accompaniment. Audio may be dubbed onto the digital video data afterwards using special software.

Computer users have also used standard video cameras to capture video images with accompanying audio. The captured video and audio data is then passed through a special device to convert the video and audio data into a format which allows the computer to store the video and audio data as .AVI or .MPEG files. Although this arrangement allows a computer user to acquire video images with accompanying audio in digital form, captured video images must undergo additional processing to place the video and audio data in a computer recognizable format.

It is therefore an object of the present invention to provide a novel device for encoding image and sound data directly into a computer recognizable format and saving the encoded image and sound data to a hard disk drive in real time.

SUMMARY OF THE INVENTION

According to one aspect of the present invention there is provided a portable device for encoding and saving image and sound data comprising:

a housing including operator controls;

a lens on said housing;

at least one microphone on said housing;

processor circuitry within said housing and communicating with said manually operable controls and said at least one microphone, said processor circuitry generating image data and capturing sound data received via said at least one microphone in response to user input made via said operator controls, said processor circuitry including an encoder to encode the image and sound data directly into a computer recognizable format; and a hard disk drive within the housing on which encoded image and sound data is saved.

In a preferred embodiment, the processor circuitry includes an image processor and a main processor. The image processor includes a digital image sensor receiving light via the lens and an image data encoder to encode digital image data output by the image sensor. The main processor includes a sound data encoder to encode sound data captured by the at least one microphone that accompanies the image data. The main processor receives the encoded image data from the image processor and stores the encoded image data and accompanying encoded sound data as a file to the hard disk drive in real time.

In one embodiment, the image data encoder includes a video decoder to digitize image data input into the device from an external source and an MPEG codec to encode image data from the image sensor and as well as digital image data output by the video decoder. Preferably, the MPEG codec can be conditioned to either a high or low resolution mode in response to user input made via the operator controls. In each of these modes, the image processor encodes continuous image data. It is also preferred that the MPEG codec can be conditioned to a still capture mode in response to user input made via the operator controls. In the still capture mode, the MPEG codec encodes discrete image frames.

In a preferred embodiment, the main processor includes an audio encoder communicating with the at least one microphone for digitizing sound data received via the at least one microphone. The main processor also includes a central processing unit executing MPEG encoding software for encoding the digitized sound data received from the audio encoder.

Preferably, the image processor is disposed on a first board within the housing and the main processor is disposed on a second board within the housing. The hard disk drive is sandwiched between the first and second boards in a compact arrangement.

According to another aspect of the present invention there is provided in combination, a portable device for encoding and saving image and sound data and a base station including a processor and a removable hard disk drive on which data saved by said device may be downloaded and saved, said device comprising:

a housing including operator controls;

a lens on said housing;

at least one microphone on said housing;

processor circuitry within said housing and communicating with said manually operable controls and said at least one microphone, said processor circuitry capturing image data and sound data in response to user input made via said operator controls, said processor circuitry including an encoder to encode the image and sound data directly into a computer recognizable format;

a hard disk drive within the housing on which encoded image and sound data is saved; and at least one output port for coupling to said base station to allow encoded image and sound data saved to said hard disk drive to be downloaded to said base station.

The present invention provides advantages in that image and sound data is encoded directly into a computer recognizable format and saved on a hard disk drive in real time. As a result, a significant amount of sound and image data may be saved by the device. The hard disk drive is accessible by a host such as for example, a personal computer or base station, to allow sound and image data saved to the hard disk drive to be downloaded to the personal computer or base station in a quick and convenient manner.

BRIEF DESCRIPTION OF THE DRAWINGS

An embodiment of the present invention will now be described more fully with reference to the accompanying drawings in which:

FIG. 4 is a right side elevational view of the device of FIG. 1;

FIG. 5 is a left side elevational view of the device of FIG. 1;

DETAILED DESCRIPTION OF THE PREFERRED EMBODIMENTS

Figure 1:
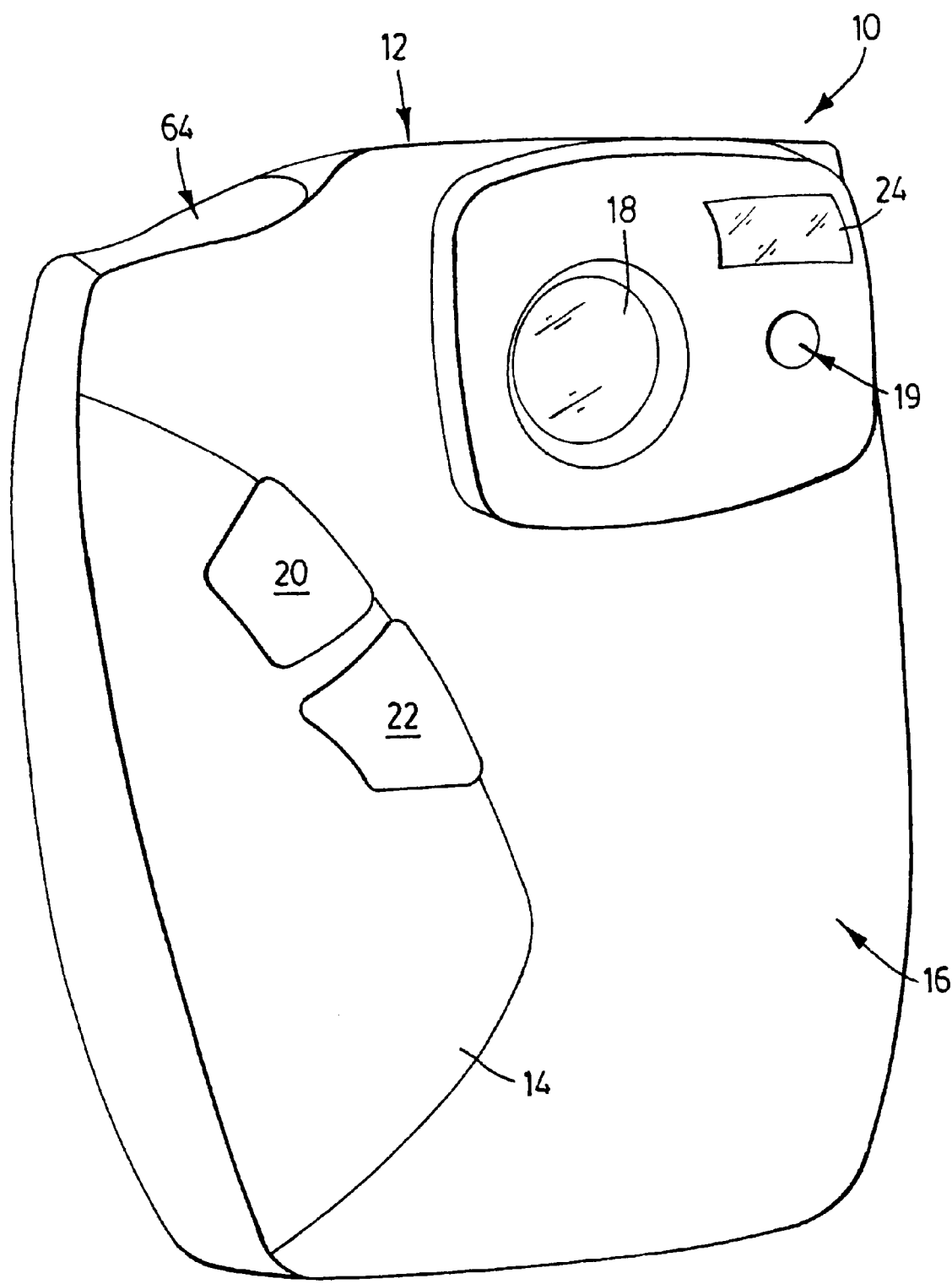
FIG. 1 is a front elevational view of a device for encoding image and sound data directly into a computer recognizable format and saving the encoded image and sound data on a hard disk drive in real time in accordance with the present invention.
Figure 2:
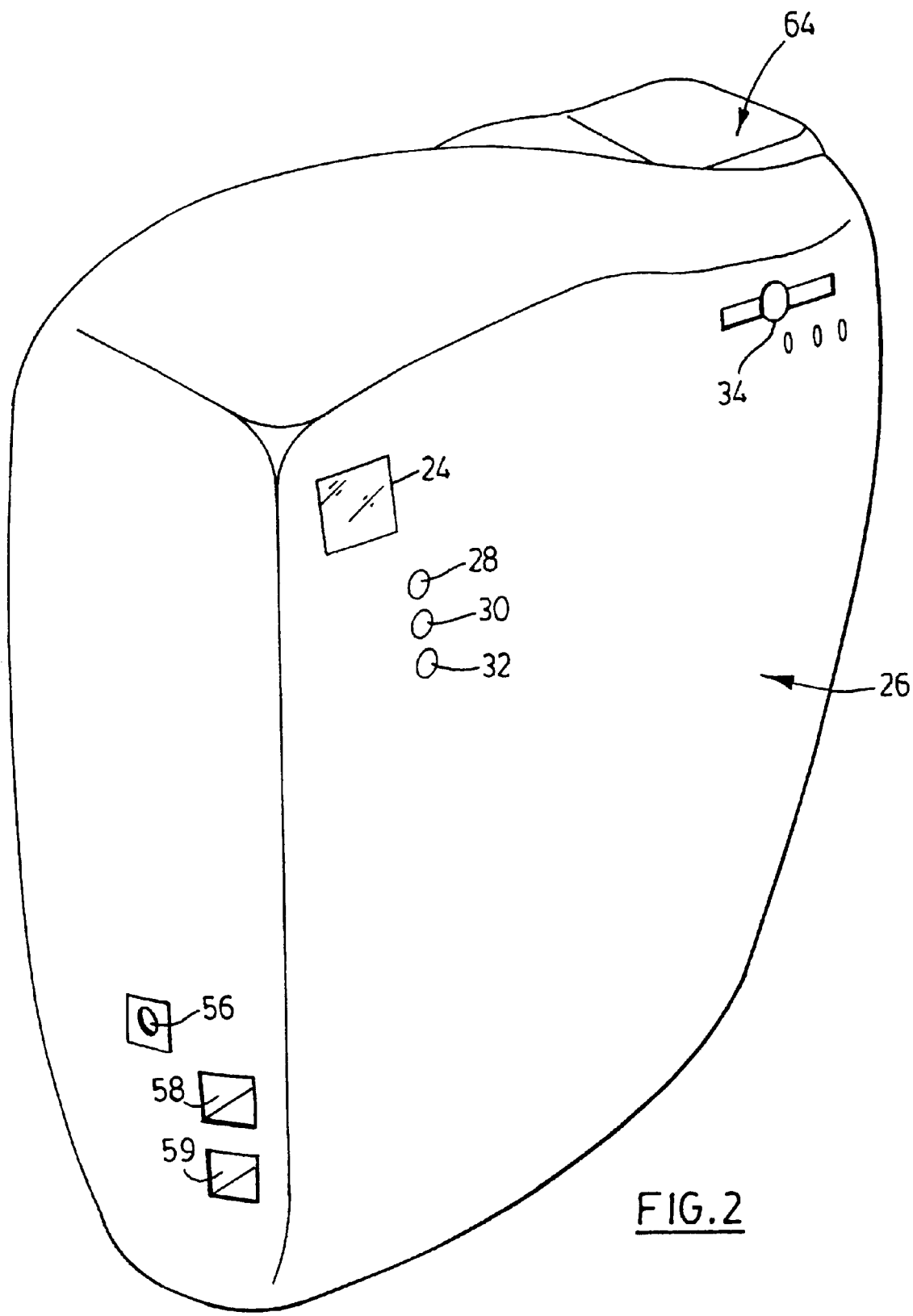
FIG. 2 is a perspective view taken from above and from the rear of the device of FIG. 1.
Figure 3:
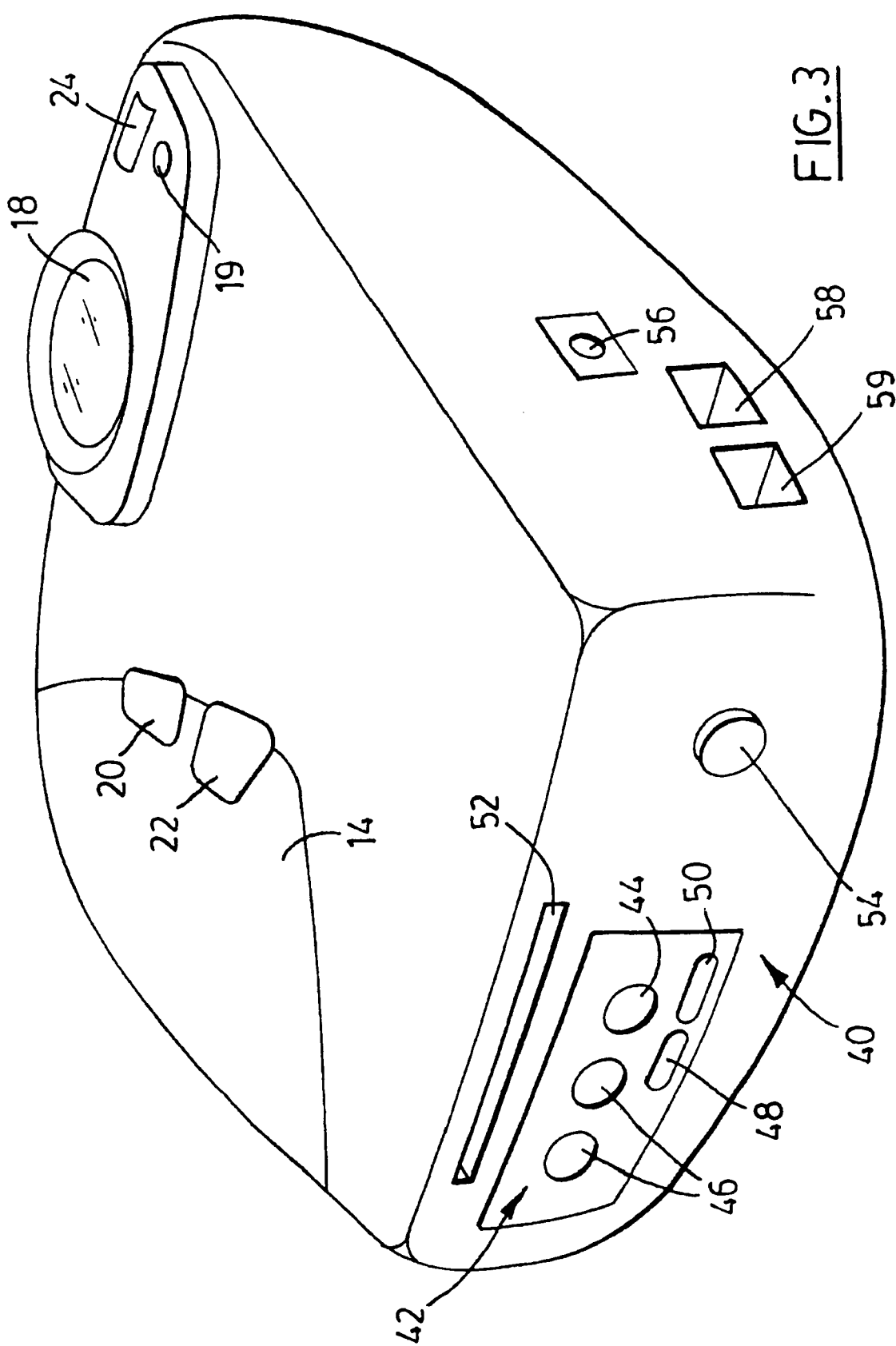
FIG. 3 is a perspective view taken from the below and from the front of the device of FIG. 1.

Turning now to FIGS. 1 to 5, a portable device for encoding image and sound data directly into a computer recognizable format and saving the encoded image and sound data to a hard disk drive in real time in accordance with the present invention is shown and is generally indicated to by reference numeral 10. As can be seen, the device 10 includes a housing 12 configured to define a handgrip 14 at one side of the of the housing 12. The front 16 of the housing 12 has a standard C/CS type lens mounting structure thereon to accommodate releasably a removable lens 18. A microphone 19 is positioned to one side of the lens 18. A record/pause key 20 and a new file key 22 are also disposed on the front 16 of the housing 12 adjacent the handgrip 14 to facilitate manual actuation by an operator. Above the microphone 19 is an optical viewfinder 24, which extends through the housing 12. The optical viewfinder 24 allows an operator to determine visually the field of view of the lens 18.

Positioned below the optical viewfinder 24 on the rear 26 of the housing 12 are three light emitting diodes (LEDs) 28 to 32 respectively. LED 28 is a power indicator and is illuminated when the device 10 is on. LED 30 is a record indicator and is illuminated when the device 10 is conditioned to a record mode. If the record mode is paused, the LED 30 flashes. LED 32 is a memory capacity indicator. To one side of the LEDs is an on/off switch 34 in the form of a slider. The on/off switch 34 has three "on" settings, namely a high resolution setting, a low resolution setting and a still capture setting.

The bottom 40 of the housing 12 includes a recessed area 42, which accommodates an external video input jack 44, a pair of external audio input jacks 46, an erase-all button 48 and a reset button 50. A PCMCIA slot 52 is also provided in the bottom 40 of the housing 12 adjacent the recessed area 42. A mount 54 for a tripod is provided in the bottom of the housing 12 to one side of the recessed area 42.

Provided in the side of the housing 12 opposite the handgrip 14 is a DC power connector 56, a universal serial bus (USB) port 58 and an Ethernet port 59.

A battery compartment 60 is provided within the housing 12 behind the handgrip 14 and accommodates a plurality of batteries 62. The battery compartment 60 is accessible via a removable access panel 64 on the top of the housing 12 to facilitate replacement of the batteries 62.

Figure 6:
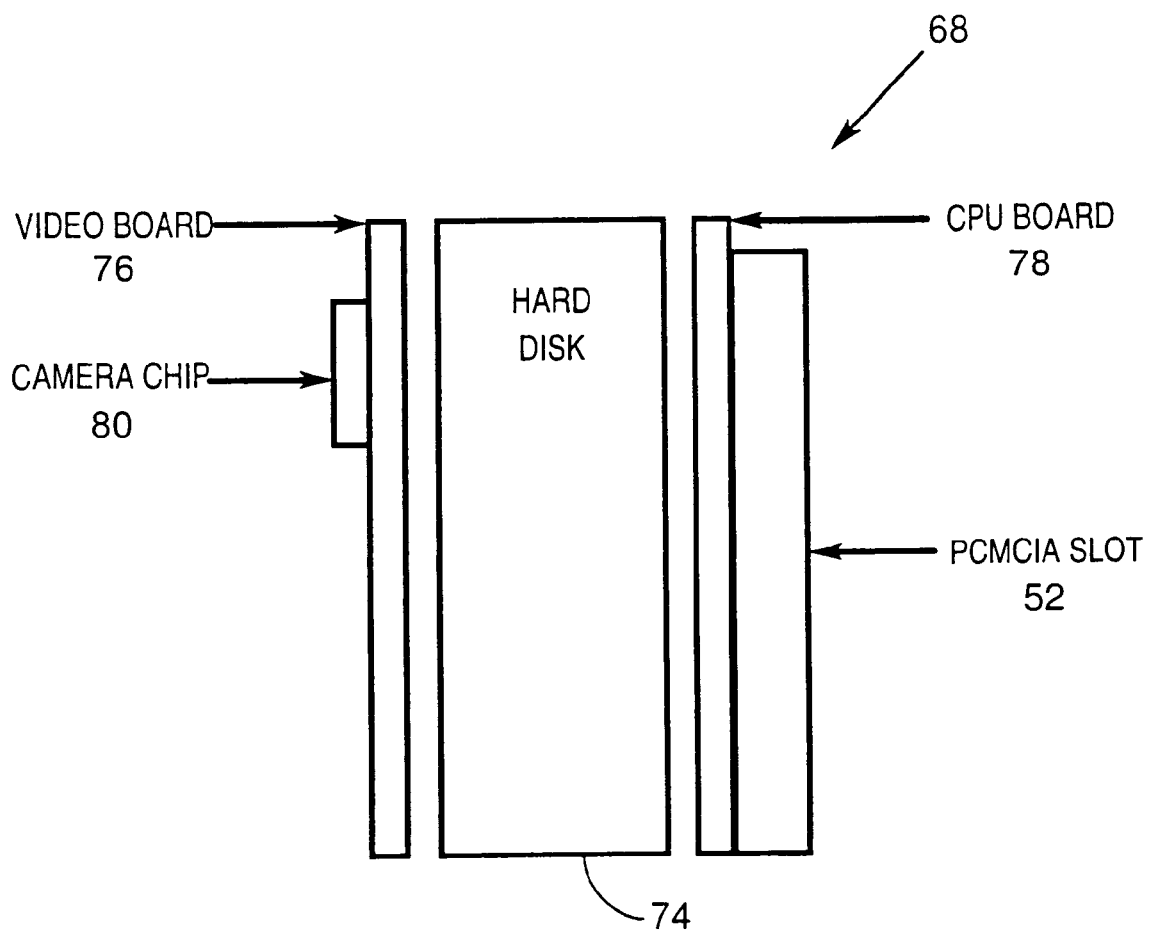
FIG. 6 is a schematic diagram of the electronics arrangement within the device of FIG. 1.
Figure 7:
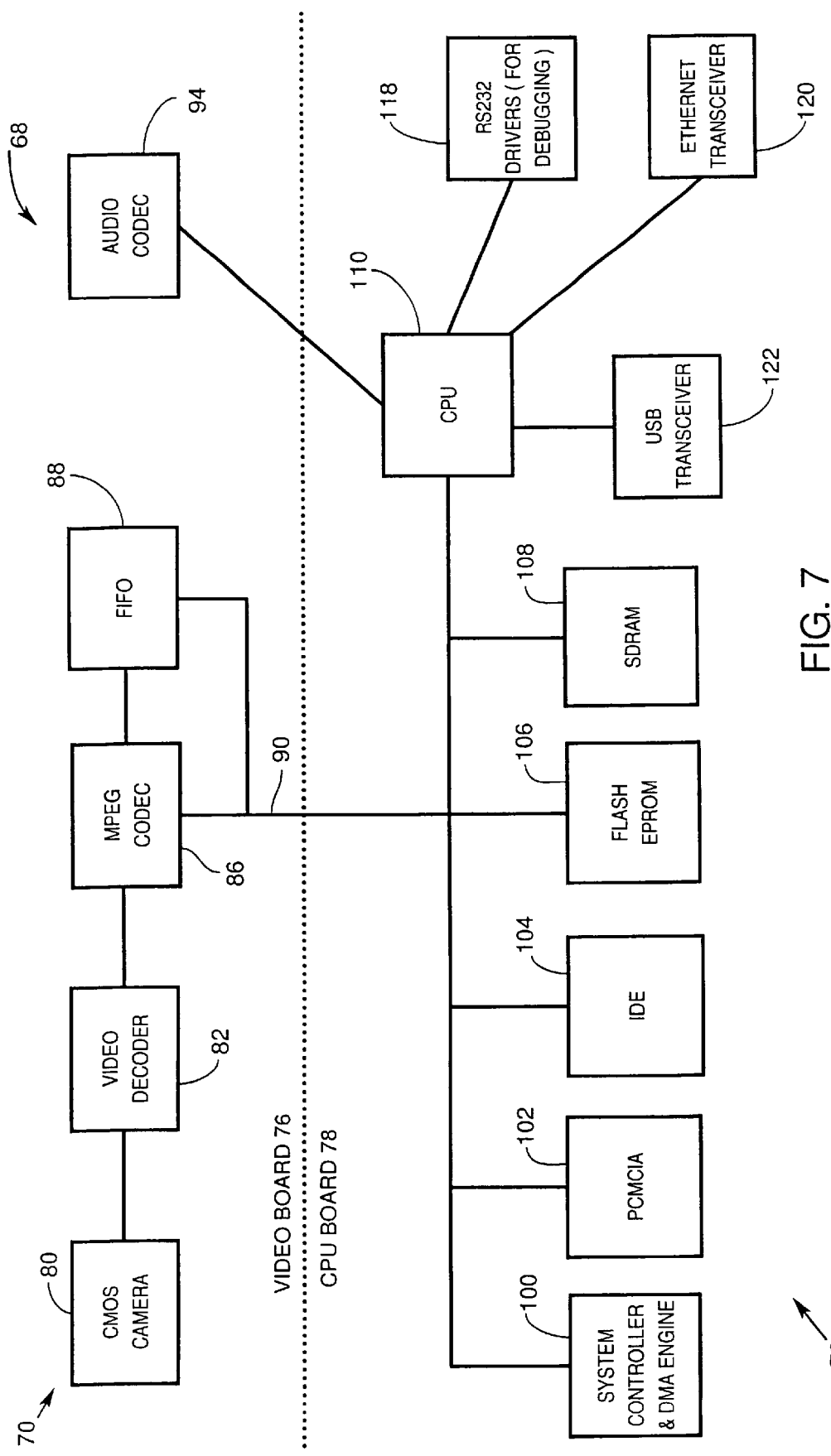
FIG. 7 is a schematic block diagram of the device electronics.

Processor circuitry generally identified by reference numeral 68 in FIGS. 6 and 7 is disposed within the housing 12. The processor circuitry 68 includes an image data processor 70 and a main processor 72. A hard disk drive 74 such as the Travelstar 4GN sold by International Business Machines Corporation is also disposed within the housing 12 and communicates with the processor circuitry 68. The components constituting the image data processor 70 are disposed on a board 76. The components constituting the main processor 72 are disposed on a board 78. The hard disk drive 74 is sandwiched between the boards 76 and 78 in a compact arrangement and is coupled to the main processor 72 via a 16-bit parallel bus. The hard disk drive 74 is rugged to withstand shock making the device 10 portable and reliable.

Turning now the FIG. 7, the image data processor 70 and the main processor 72 are better illustrated. As can be seen, image data processor 70 includes a single chip CMOS digital colour video image sensor 80 such as that sold by Omnivision under model No. OV7610. The digital video image sensor 80 is disposed on the board 76 behind the lens 18 and is coupled to a video decoder 82. Video decoder 82 is connected to an MPEG coder/decoder (codec) 86 such as that sold by C-Cube under model No. CLM4111RT. MPEG codec 86 is also connected to a first-in-first-out (FIFO) 88. The FIFO 88 and the MPEG codec 86 are connected to a bus 90 leading to the main processor board 78. An audio codec 94 is also disposed on board 76.

The MPEG codec 86 includes a processor and accompanying microcode to encode image data into MPEG-1 format. The codec 86 is responsive to the main processor 72 and can be conditioned to a high resolution mode, a low resolution mode and a still capture mode depending on the "on" setting of switch 34 as will be described.

The main processor 72 includes a system controller and DMA engine 100, a PCMCIA interface 102, an integrated drive electronics (IDE) interface 104, flash EPROM 106, SDRAM 108 and a central processing unit (CPU) 110, each of which is coupled to the bus 90. CPU 110 in this embodiment is a Motorola MPC823 microprocessor, which excels in low power, portable, imaging applications. The microprocessor integrates a high-performance embedded core with a communication processor module that uses a specialized RISC processor for imaging and communications. The communication processor module performs digital signal processing (DSP) to encode audio data received from the audio codec 94 into MPEG-1 format. The CPU 110 is also coupled to an RS232 driver 118, an Ethernet transceiver 120 and a USB transceiver 122 as well as the audio codec 94. A power management circuit (not shown) is also disposed on the main processor board 78. The power management circuit communicates with the battery compartment 60 and the DC power connector 56 and supplies appropriate power to the image processor 70, the main processor 72 and the hard disk drive 74.

The EPROM 106 stores a small boot-up program used to initialize the CPU 1110 and the peripherals of the device 10 when the device is powered up. The EPROM 106 also stores an operating system, in this example Windows CE. Windows CE is a portable, real time modular operating system including Microsoft programming interfaces. An OEM adaptation layer communicates with the core of the operating system and device hardware including timers, the USB transceiver 122, the PCMCIA interface 102 and the Ethernet transceiver 120. Device drivers are also provided to interface device hardware and the operating system.

Applications software is also stored in the EPROM 106 and is executed by the CPU 110. Execution of the application software controls the overall operation of the device 10 allowing the processor circuitry 68 to respond to actuation of the keys and buttons, illuminate the LEDs 28 to 32, encode image and sound data, and read and write data to the hard disk drive 74.

When the device 10 is turned on by sliding the switch 34 from its off position to one of its "on" settings, the power management circuit supplies power from either the batteries or a power source coupled to the DC power connector 56, to the image data processor 70, main processor 72 and hard disk drive 74. The main processor 72 in turn illuminates the LED 28. If the power level of the batteries falls below a threshold, the main processor 72 flashes the LED 28 to signify a low power condition.

At power up, the CPU 110 executes the boot-up program in the EPROM 106 to initialize the device 10 placing the device 10 into a ready state. At this point, the CPU 110 monitors the buttons and keys and responds to manual actuation of the buttons and keys in the appropriate manner. If the switch 34 is positioned to the high resolution setting, the CPU 110 conditions the MPEG codec 86 to a high resolution mode (352×240 resolution). If the switch 34 is positioned to the low resolution setting, the CPU 110 conditions the MPEG codec 86 to a low resolution mode (176×120 resolution). If the switch 34 is positioned to the still capture setting, the CPU 110 conditions the MPEG codec 86 to a still capture mode (640×480 resolution).

In general, when the record/pause key 20 is pressed, the device 10 encodes and saves image and sound data in a file on the hard disk drive 74 in real time. If the MPEG codec 86 is conditioned to either the high or low resolution mode, the device 10 encodes and saves continuous digital image and sound data to the hard disk drive 74. Pressing the record/pause key 20 again in this mode, stops data acquisition. When recording has been paused, the main processor 72 flashes LED 30. If the MPEG codec 86 is conditioned to the still capture mode, the device 10 encodes and saves a single digital image frame on the hard disk drive 74 when the record/pause key 20 is pressed. If the record/pause key 20 is held in a pressed conditioned, the device 10 encodes and saves a series of digital image frames on the hard disk drive 74 until the record/pause key 20 is released. Further details of the data encoding and saving will now be described.

If the switch 34 is in either its high or low resolution setting and the record/pause key 20 is pressed, the CPU 10 conditions the MPEG codec 86 to acquire directly and continuously image data from the CMOS image sensor 80. The MPEG codec 86 in turn converts the image data into MPEG-1 format having a resolution dependent on its mode setting and outputs the encoded image data to the FIFO 88.

Encoded image data loaded into FIFO 88 is conveyed to the main processor 72 via the bus 90 and is cached. During the acquisition of the image data, accompanying sound data is also acquired via the microphone 19. Audio picked up by the microphone 19 is converted into digital form by the audio codec 94 before being conveyed to the CPU 110. The CPU 10 encodes the digital audio into MPEG-1 format and combines the digital audio with the encoded image data. The encoded image and sound data is then saved to the hard disk drive 74 as a file via the IDE interface 104. Files saved on the hard disk drive 74 are sequentially numbered using a naming convention that allows for up to an eight character name followed by a three letter extension. The first three characters of the name are company identifiers while the following five characters are an alphanumeric series.

Encoded image and sound data acquired by the device 10 during each recording session is saved under a single file name on the hard disk drive 74 until the new file key 22 is pressed. During a recording session, if the new file key 22 is pressed, the CPU 10 closes the current file and creates a new file on the hard disk drive 74 for the subsequent encoded image and sound data.

If the switch 34 is in its still capture setting when the record/pause key 20 is pressed, the CPU 10 conditions the MPEG codec 86 to grab a single frame from the CMOS image sensor 80. In this mode, the MPEG codec 86 converts the digital image data into JPEG format and outputs the encoded image data to the FIFO 88. The encoded image data loaded into FIFO 88 is conveyed to the main processor 72 via the bus 90 and is cached before being saved as a file to the hard disk drive 74 by the CPU 110.

If the MPEG codec 86 is in the still capture mode and the record/pause key 20 is held in a pressed condition, the MPEG codec 86 is conditioned to grab a series of image frames from the CMOS image sensor 80 for as long as the record/pause key 20 is held. Each grabbed image frame is converted into JPEG format before being saved to the hard disk drive 74 as a separate file in the manner described above.

If desired video image data can input into the device 10 from an external source via video input jack 44. In this case, the input video image data received from the external source is processed by the video decoder 82. The digital image data output by the video decoder 82 is then passed to the MPEG codec 98 and processed accordingly, depending on the "on" setting of the switch 34.

In addition, accompanying audio can be input into the device 10 via the external audio input jacks 46. When audio is received from an external source via the audio input jacks 46, the microphone 19 is disabled. The audio is converted into digital format via audio codec 94 and is processed in the manner described previously.

As files are stored on the hard disk drive 74, the CPU 110 monitors disk space and illuminates the LED 32 depending on the amount of memory available on the hard disk drive 74. Specifically, when the hard disk drive 74 is less than 50% full, the LED 32 is illuminated green. When the hard disk drive is between 50% and 75% full, the LED 32 flashes green. When the hard disk drive is more than 75% full, the LED 32 flashes red. When the hard disk drive 74 is full, the LED 32 is illuminated red. Hard disk drive memory can be made available by downloading the files to a host and then conditioning the host to send an erase file instruction to the CPU 110 or alternatively by pressing the erase-all key 48. When the erase-all key 48 is pressed, the CPU 110 completely erases the hard disk drive 74.

If the reset key 50 is pressed, the CPU 110 re-executes the boot-up program in the EPROM 106 to re-initialize the device 10.

The USB connector 58 allows the device 10 to be coupled directly to a personal computer or to a base station via a cable. When this is done, the hard disk drive 74 can be accessed by the personal computer or base station via the USB transceiver 122 and the CPU 110 allowing files thereon to be downloaded, erased, renamed etc. The Ethernet port 59 allows the device 10 to be connected directly to a computer network. In this manner, files on the hard disk drive 74 can be accessed by a computer coupled to the computer network via the Ethernet transceiver 120 and the CPU 110.

The PCMC1A slot 52 accommodates PCMCIA type II cards including PCMCIA network cards, PCMCIA modem cards etc. allowing the device 10 to communicate directly with third party hardware and applications via the PCMCIA interface 102 and the CPU 110.

The RS232 driver 118 acts between the CPU 10 and an internal RS232 connector, and allows device software to be debugged.

Figure 8:
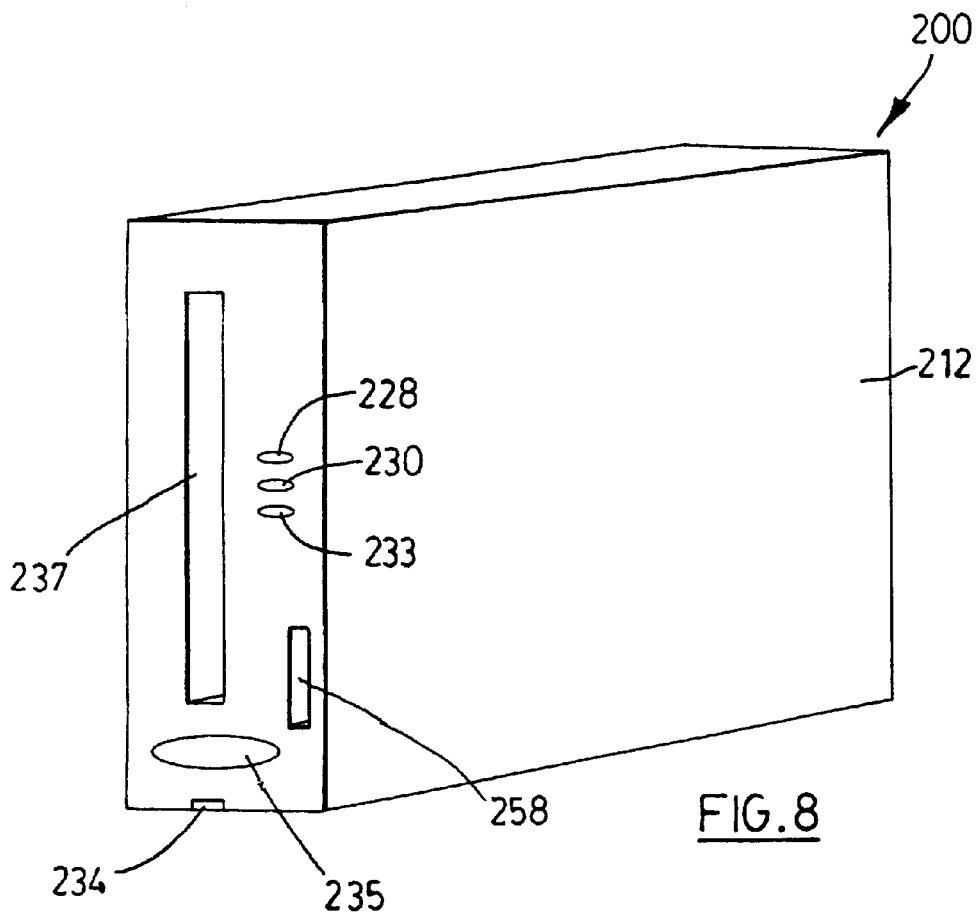
FIG. 8 is a perspective view taken from above and from the front of a base station.
Figure 9:
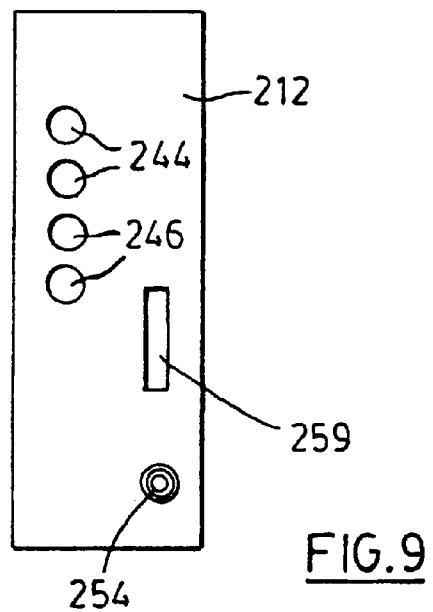
FIG. 9 is a rear elevational view of the base station of FIG. 8.
Figure 10:
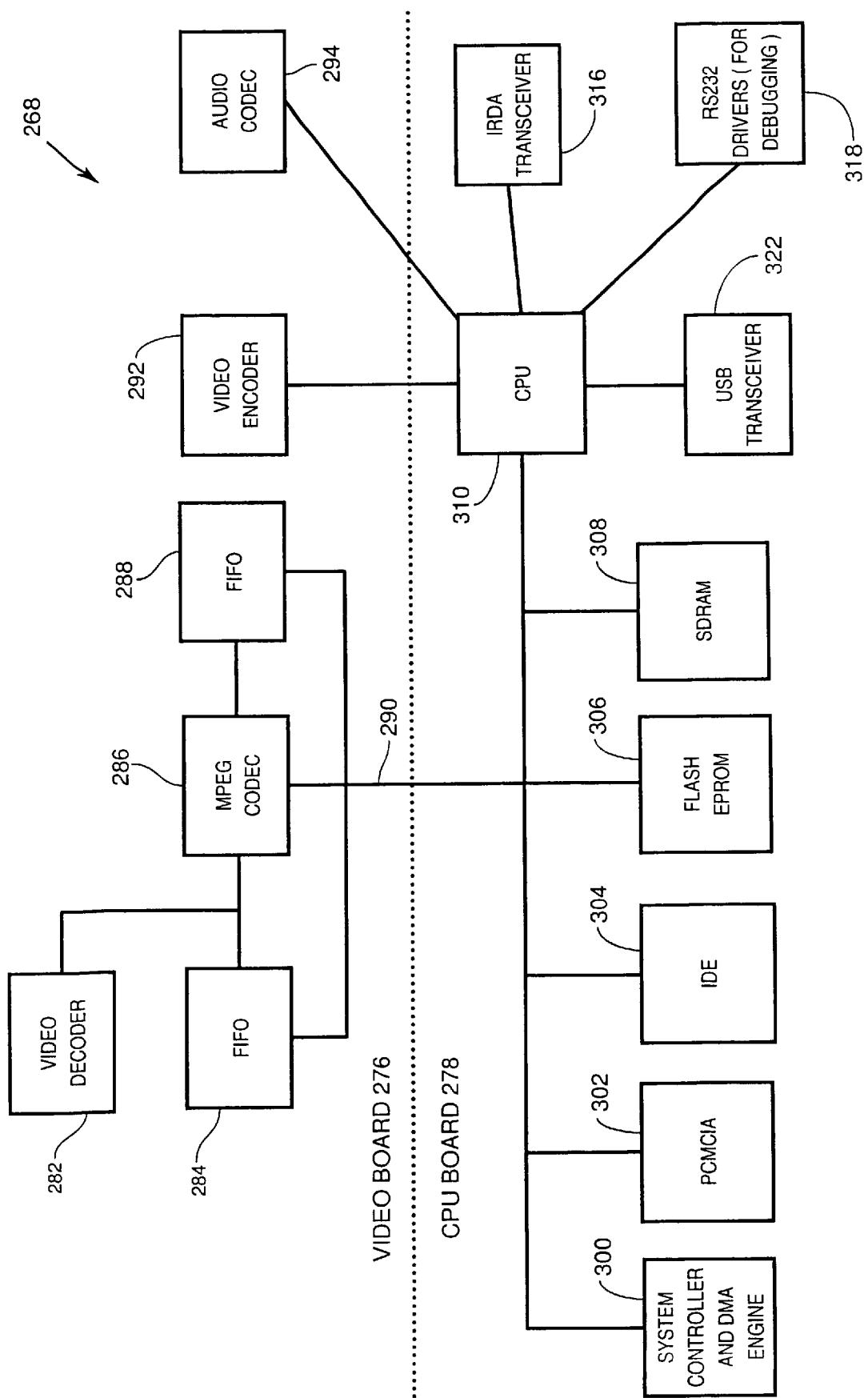
FIG. 10 is a schematic block diagram of the base station electronics.

Turning now to FIGS. 8 to 10, a base station for coupling to the device 10 is shown and is generally indicated to by reference numeral 200. As can be seen, the base station 200 includes a housing 212. Provided on the front face of the housing 212 are an on/off switch 234, a USB port 258, a power LED 228, a record LED 230 and a play LED 233. An infrared sensor 235 and a drive bay 237 accommodating a removable hard disk drive such as the Castlewood ORB are also provided on the front face of the housing 212.

Provided on the rear face of the housing 212 are video input and output jacks 246, audio input and output jacks 246, a DC power connector 254 and a second USB port 259.

Processing circuitry generally identified by reference numeral 268 is provided in the housing 212 and is similar to the processor circuitry within the device 10. As can be seen, the processing circuitry 268 includes a video board 276 and a CPU board 278. Disposed on the video board 276 is a video decoder 282 for receiving input video data via the video input jack 244. Video decoder 282 is connected to a FIFO memory 284 and to an MPEG codec 286. MPEG codec 286 is also connected to a second FIFO 288. The FIFOs 284 and 288 and the MPEG codec 286 are connected to a bus 290 leading to the CPU board 278. A video encoder 292 and an audio codec 294 are also disposed on the video board 276.

Disposed on the CPU board 278 is a system controller and DMA engine 300, a PCMCIA interface 302, an IDE interface 304, flash EPROM 306, SDRAM 308 and a central processing unit (CPU) 310, each of which is coupled to the bus 290. The CPU 310 is also coupled to an IRDA transceiver 316, an RS232 driver 318, and USB transceivers 322 as well as the video encoder 292 and the audio codec 294.

The device 10 can be connected to the base station 200 by a cable coupled to the USB ports 58 and 258 respectively. This allows files stored on the hard disk drive 74 to be downloaded into the base station 200 via the USB transceiver 322 and the CPU 310 and saved on the removable hard disk drive. The hard disk drive can be removed from the base station 200 via the bay 237 and transported to any desired location.

Image data from an external source can also be encoded and saved on the removable hard disk drive by inputting the video image data via the video input jack 244. The input video image data is processed in a similar manner to that described above with reference to device 10. Accordingly, the input video image data is digitized by video decoder 282 before being encoded by MPEG codec 286. The encoded image data is then directed to FIFO 288 before being downloaded by the CPU 310 and saved on the hard disk drive. Accompanying sound data received via the audio input jack 246 is processed by the audio codec 294 and the CPU 310 in the same manner as described previously with reference to device 10 and is saved on the hard disk drive with the image data.

The encoded image and sound data stored on the hard disk drive within the base station 200 may be output to a personal computer via USB transceiver 322 and the USB port 259 or may be output to a playback unit. In the latter case, the CPU 310 conveys the image data to the MPEG codec 286 which decodes the image data. The decoded image data is stored in FIFO 284. The image data stored in FIFO 284 is retrieved by the CPU 310 and is conveyed to the video encoder 292 before being output to the playback unit via the video output jack 244. Accompanying sound data is decoded by the CPU 310 and is conveyed to the audio codec 294 before being output to the playback unit via the audio output jack 246.

The infrared sensor 235 and IRDA transceiver 316 allow a user to control operation of the base station 200 by entering input commands using a hand-held remote control unit in a well known manner.

Although a preferred embodiment of the present invention has been described, those of skill in the art will appreciate that variations and modifications may be made without departing from the spirit and scope thereof as defined by the appended claims.

What is claimed is:

1. A portable device for encoding and saving image and sound data comprising:
   a housing including operator controls;
   a lens on said housing;
   at least one microphone on said housing;
   memory within the housing to which encoded image and sound data is saved;
   an image processor mounted on a first board within said housing, said image processor capturing image and sound data; and
   a main processor mounted on a second board within said housing, said main processor receiving captured image and sound data from said image processor and saving said image and sound data to said memory, wherein said memory is sandwiched between said first board and said second board in a compact arrangement.

2. A device as defined in claim 1 wherein said image processor includes an image sensor, a video decoder and an MPEG codec, said video decoder digitizing image data received from an external source, said MPEG codec encoding image data output by said image sensor and by said video decoder.

3. A device as defined in claim 2 wherein said MPEG codec includes high and low resolution modes, said MPEG codec being conditioned by said main processor to one of said high and low resolution modes in response to user input made via said operator-controls, said image processor capturing continuous image data when said MPEG codec is in one of said high and low resolution modes.

4. A device as defined in claim 2 wherein said main processor includes a central processing unit and an audio encoder communicating with said at least one microphone, said audio encoder digitizing sound data received via said at least one microphone, said central processing unit executing MPEG encoding software and encoding digitized sound data received from said audio encoder.

5. A device as defined in claim 3 wherein said MPEG codec further includes a still capture mode, said MPEG codec being conditioned by said main processor to said still capture mode in response to user input made via said operator controls, said MPEG codec capturing discrete image frames when said MPEG codec is in said still capture mode.

6. A device as defined in claim 3 wherein said MPEG codec encodes said image data into MPEG-1 format.

7. A device as defined in claim 5 wherein said operator controls include a plurality of manually actuable keys on said housing, said plurality of keys including a record key and a mode select key, said main processor conditioning said MPEG codec to one of said high resolution, low resolution and still capture modes in response to manual actuation of said mode select key and conditioning said image processor to capture and encode image data in response to manual actuation of said record key.

8. A device as defined in claim 7 wherein said plurality of keys further includes a new file key, said main processor storing encoded image and sound data in separate files to said hard disk drive in response to manual actuation of said new file key.

9. A device as defined in claim 3 wherein said housing includes at least one output port to enable encoded image and sound data saved to said hard disk drive to be downloaded to a host.

10. A device as defined in claim 9 wherein said at least one output port includes at least one of a universal serial bus, a PCMCIA slot and an Ethernet port.

11. A device as defined in claim 10 wherein said host is a base station, said device and base station being connected by a cable coupled to a universal serial bus connector on each of said device and base station.

12. In combination, a portable device for encoding and saving image and sound data and a base station including a processor and a removable hard disk drive on which data saved by said device is downloaded and saved, said device comprising:

a housing including operator controls;

a lens on said housing;

at least one microphone on said housing;

a hard disk drive within the housing on which encoded motion and sound data is saved;

an image processor mounted on a first board within said housing, said image processor capturing image and sound data;

a main processor mounted on a second board within said housing, said main processor receiving captured image and sound data from said image processor and saving said image and sound data to said memory, wherein said memory is sandwiched between said first board and said second board in a compact arrangement; and at least one output port for coupling to said base station to allow encoded and sound data saved on said hard disk drive to be downloaded to said base station.

* * * * *